United States Patent
Kuze

[11] Patent Number: 6,138,342
[45] Date of Patent: *Oct. 31, 2000

[54] MULTI-STAGE ASSEMBLING ROBOT

[76] Inventor: Yoshikazu Kuze, 31-3, Higashimagone 1-chome, Okta-ku, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/092,273

[22] Filed: Jun. 5, 1998

[30] Foreign Application Priority Data

Jun. 6, 1997 [JP] Japan .................................. 9-184259

[51] Int. Cl.[7] .................................................. B23Q 41/00
[52] U.S. Cl. ............................ 29/564.1; 29/771; 72/4; 72/405.14
[58] Field of Search ...................... 29/771, 790, 792, 29/787, 700, 564.1, 706, 563; 72/4, 405.14, 421, 422, 456; 198/621.1; 470/109, 154

[56] References Cited

U.S. PATENT DOCUMENTS

| | | | |
|---|---|---|---|
| 3,159,855 | 12/1964 | Wallace et al. ......................... | 29/771 |
| 3,266,132 | 8/1966 | Wideburg et al. ..................... | 29/790 |
| 3,409,972 | 11/1968 | Cervanka et al. ..................... | 29/771 |
| 3,591,913 | 7/1971 | Lewis ..................................... | 29/771 |
| 5,076,083 | 12/1991 | Kuze ..................................... | 72/421 |
| 5,323,530 | 6/1994 | Goto et al. ............................ | 29/771 |
| 5,435,056 | 7/1995 | Liechty et al. ........................ | 29/771 |
| 5,519,932 | 5/1996 | Kuze ..................................... | 29/771 |
| 5,640,756 | 6/1997 | Brown et al. ......................... | 29/792 |

*Primary Examiner*—Irene Cuda
*Assistant Examiner*—Trinh Nguyen
*Attorney, Agent, or Firm*—Dennison, Scheiner, Schultz & Wakeman

[57] ABSTRACT

A multi-stage robot has at least three sets of upper and lower dies are mounted on the upper movable plate and base plate; a work pick-and-place device is mounted on the lower movable plate provided to be reciprocated in the horizontal direction and reciprocated in the vertical direction so as to progressively transfer parts on the lower dies; at least three part pick-and-place devices are radially mounted on the base plate; each of the part pick-and-place devices is provided to be reciprocated in the horizontal direction and reciprocated in the vertical direction so as to feed parts one by one to a corresponding lower die.

4 Claims, 6 Drawing Sheets

FIG. 5a
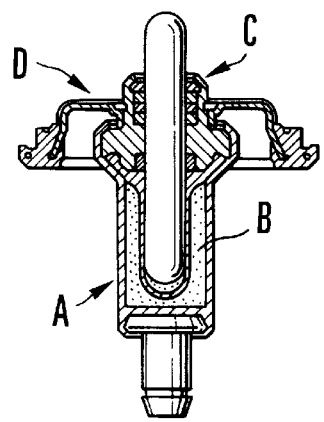
FIG. 5b  FIG. 5d  FIG. 5e  FIG. 5f
FIG. 5c
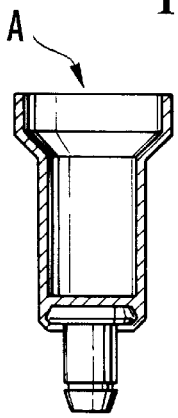
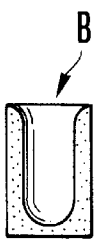
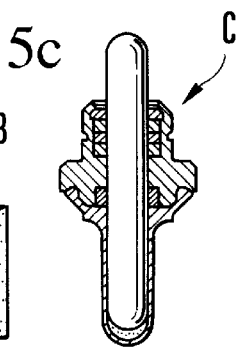
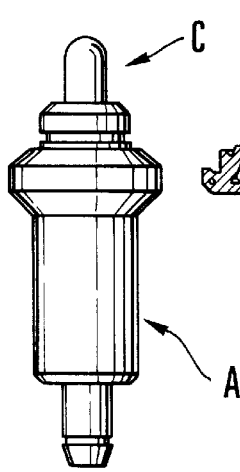
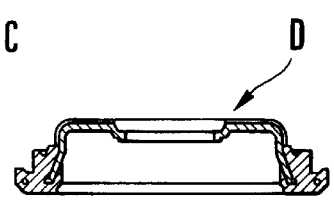

MULTI-STAGE ASSEMBLING ROBOT

BACKGROUND OF THE INVENTION

The present invention relates to a multi-stage assembling robot having a progressive feeding device.

Heretofore, there has been used a robot provided with a rotary feeder and a progressive feeding device connected to a power press. However, the robot is complicated in construction and expensive.

SUMMARY OF THE INVENTION

An object of the present invention is to provide a robot for a progressive multi-stage press machine using a die set and having a progressive pick-and-place device, whereby the robot may be simplified in construction, reduced in size, and manufactured at a low cost.

According to the present invention, there is provided a multi-stage assembling robot comprising a die set having a base plate, vertical guide posts securely mounted on the base plate, a horizontal cylinder plate securely mounted on top portions of the guide posts, an upper movable plate and a lower movable plate which are slidably mounted on the guide posts, at least three sets of upper and lower dies mounted on the upper movable plate and base plate, a first cylinder mounted on the cylinder plate, the cylinder having a piston rod which is connected to the upper movable plate, a second cylinder mounted on an underside of the base plate, the second cylinder having a piston rod which is connected to the lower movable plate, a work pick-and-place device mounted on the lower movable plate provided to be reciprocated in the horizontal direction and reciprocated in the vertical direction so as to feed works to lower dies, at least three parts pick-and-place devices radially mounted on the base plate, each of the part pick-and-place devices being provided to be reciprocated in the horizontal direction and reciprocated in the vertical direction so as to feed parts one by one to a corresponding lower die.

The work pick-and-place device has at least three sets of grasping opposite fingers, each set of grasping fingers are reciprocated by opposite cylinders, and each of the part pick-and-place device has a chuck for grasping a part.

These and other objects and features of the present invention will become more apparent from the following detailed description with reference to the accompanying drawings.

BRIEF DESCRIPTION OF DRAWINGS

FIG. 1a is a side view of a robot according to the present invention;

FIG. 1b shows a part of FIG. 1a;

FIGS. 5a to 5f show a finished product and parts for the product;

DETAILED DESCRIPTION OF THE PREFERRED EMBODIMENT

Figures 1A, 1B:
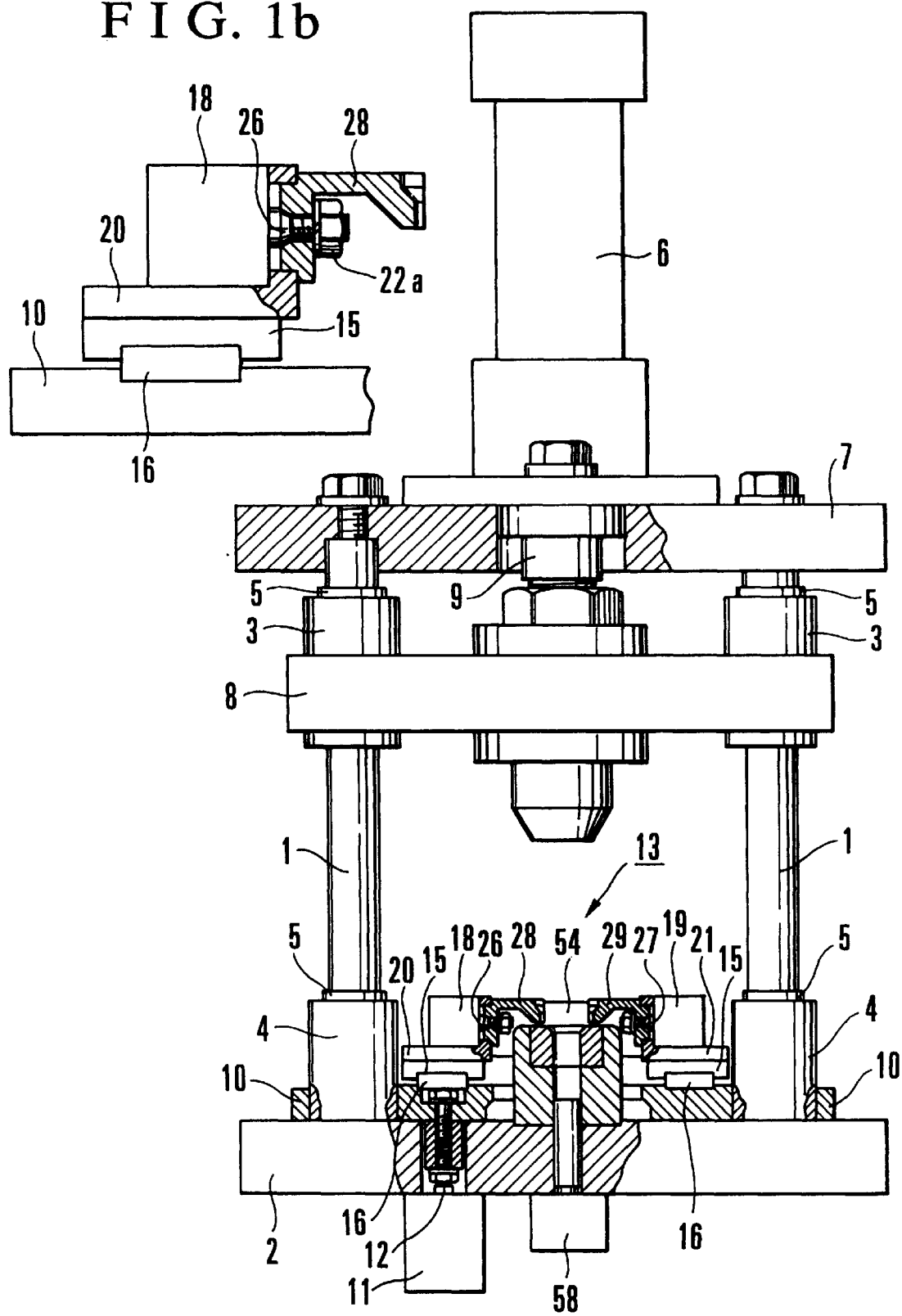
Figure 2:
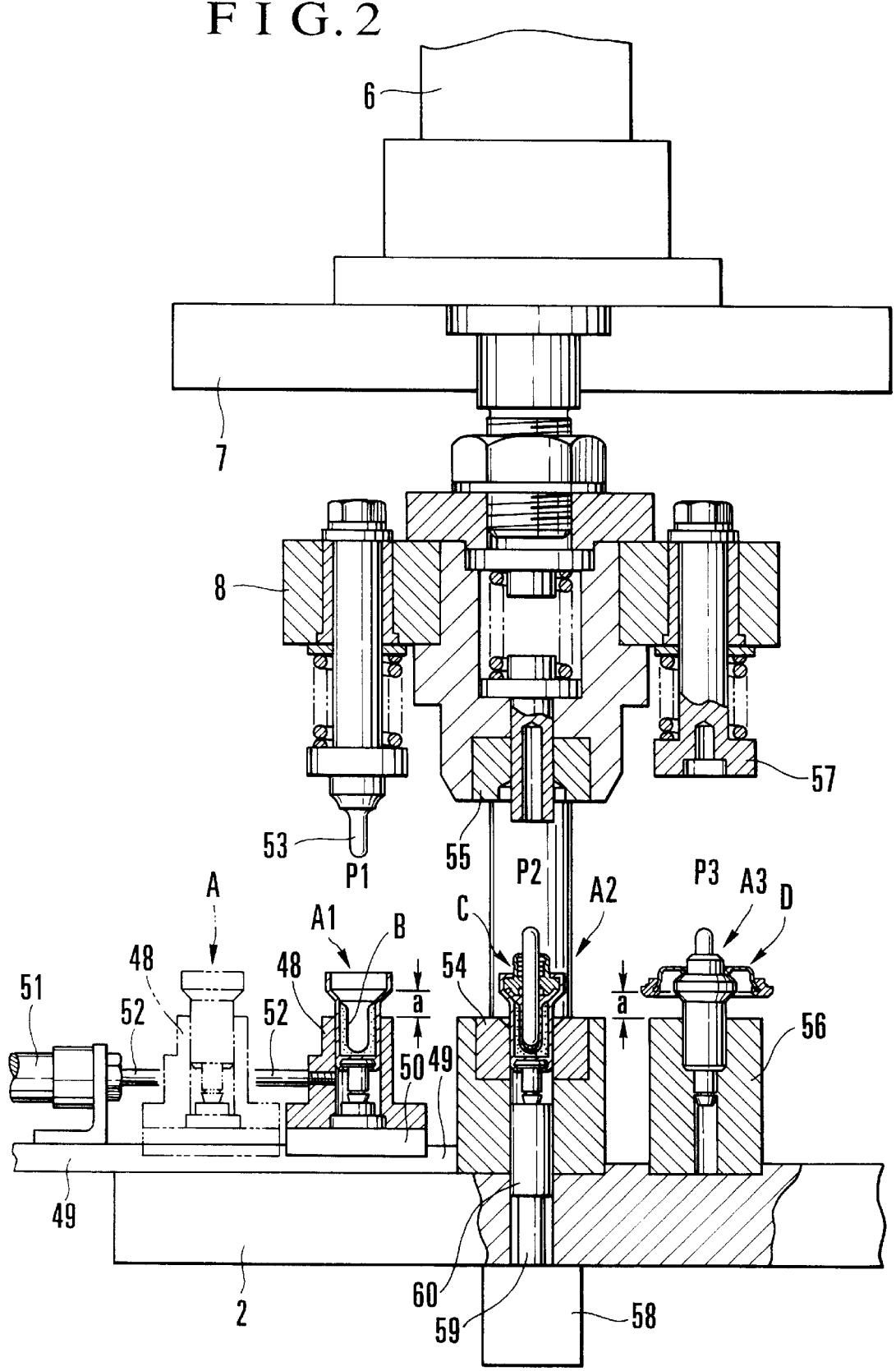
FIG. 2 is a front view showing a part of the robot.

Referring to FIGS. 1a, 1b and 2, two vertical guide posts 1 are securely mounted on a base plate 2. An upper movable plate 8 and a lower movable plate 10 are slidably mounted on the guide posts 1 by slidably engaging guide bushes 3 and 4, interposing ball sliders 5 between the guide bush and guide post 1.

A horizontal cylinder plate 7 is secured to the guide post 1 at the top of each post and secured thereto by screw. A hydraulic cylinder 6 such as an oil hydraulic cylinder or pneumatic cylinder is vertically mounted on the cylinder plate 7 and secured thereto by screws. At least one pneumatic cylinder 11 is secured to the underside of the base plate 2, and a piston rod 12 thereof is connected to the lower movable plate 10.

The piston rod 9 is secured to the movable plate 8. A movable plate 8 has a punch 53, and dies 55 and 57 (FIG. 2). On the base plate 2, lower dies 54, 56 are mounted.

Mounted on the base plate 2 is a first pick-and-place device 13 for feeding works A to D and for taking out a processed work (FIG. 2).

Figure 3:
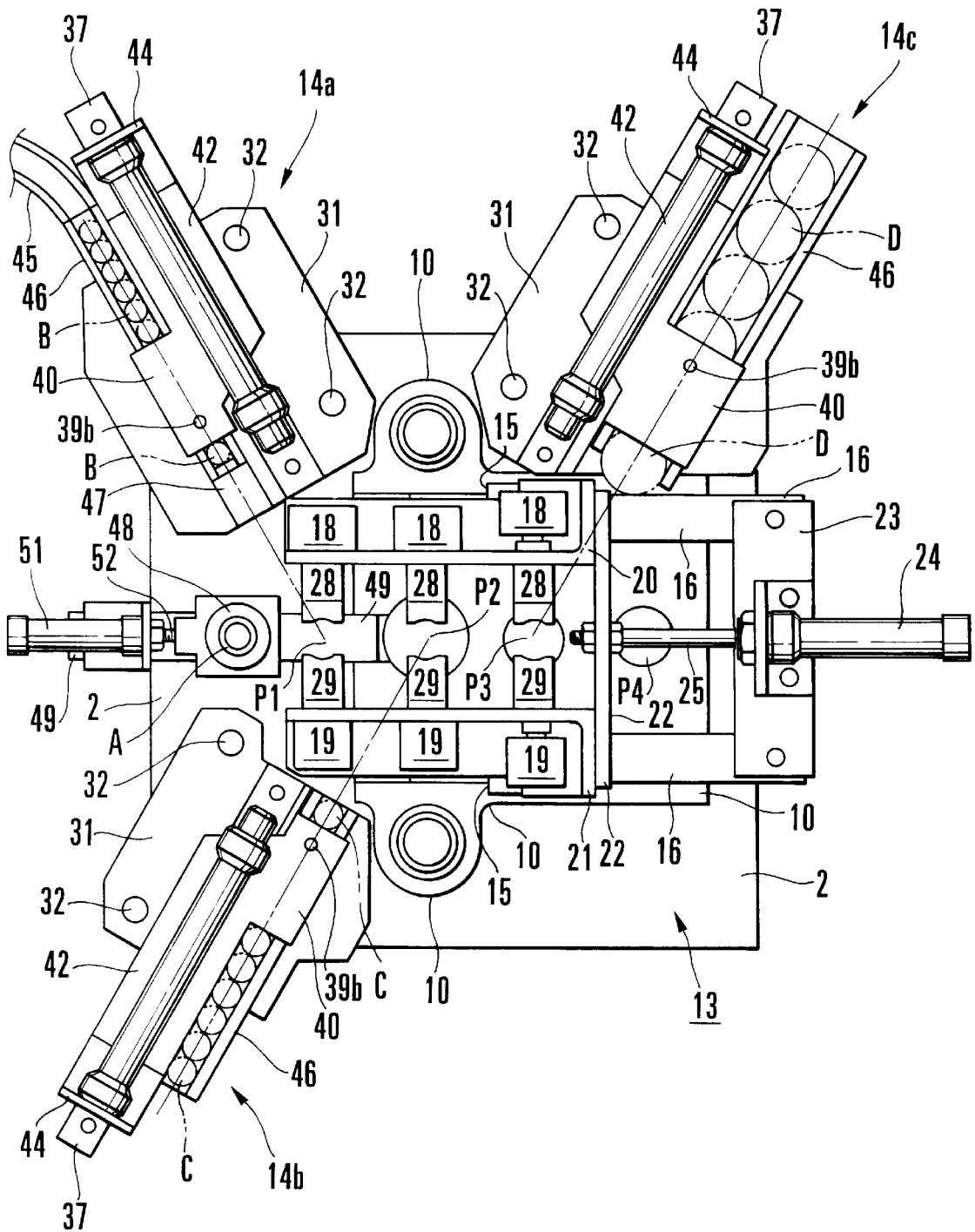
FIG. 3 is a plan view of the robot.
Figure 6:
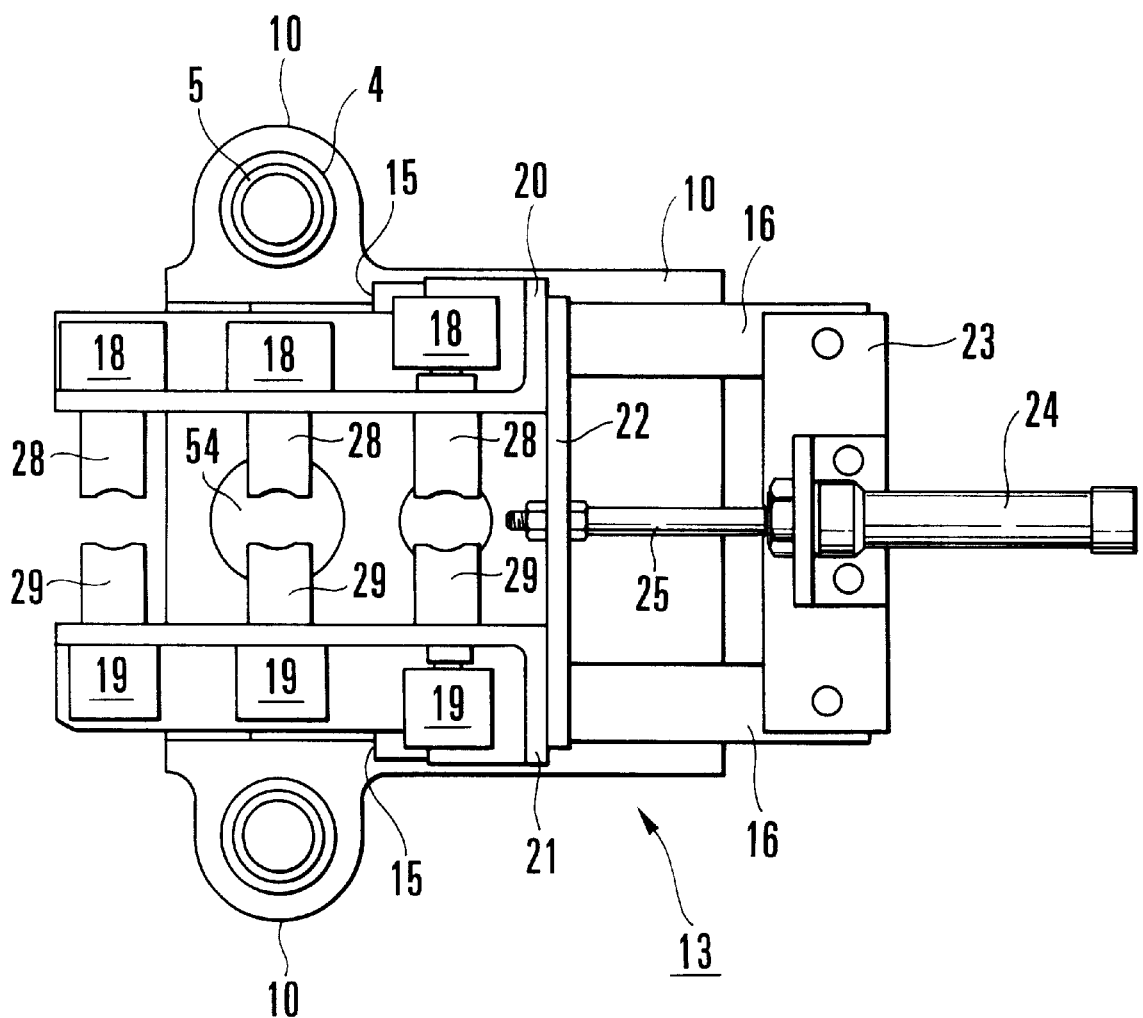
FIG. 6 is a plan view of a work pick-and place device.

Referring to FIGS. 1a, 3 and 6 showing the work pick-and-place device 13, a pair of slide guide rails 16 are securely mounted on the lower movable plate 10 parallel with each other at the opposite sides of the lower die 54. A pair of slide blocks 15 are slidably mounted on the guide rails 16. A pair of L-shaped supporting plates 20 and 21 are secured to respective slide blocks 15. The ends of the supporting plates 20, 21 are connected by a connecting plate 22. A supporting plate 23 is secured to the ends of the slide guide rails 16. A pneumatic cylinder 24 is mounted on the supporting plate 23 and a piston rod 25 is connected to the connecting plate 22.

Three pairs of grasping actuators are provided on the supporting plates 20, 21. Each grasping actuator comprises opposite pneumatic cylinders 18 and 19 secured to the opposite supporting plates 20, 21. The cylinders 18 and 19 are positioned on a first position P1, second position P2, and a third position P3 at predetermined equidistances, respectively. Opposite grasping fingers 28, 29 are secured to piston rods 26, 27 (FIG. 1b) of cylinders 18 and 19 by nuts 22 a for grasping a work.

Thus, the cylinders 18 and 19 on the supporting plates 20, 21 are reciprocated on the slide guide rails 16 between the positions P1, P2, P3 and P4 by the operation of the cylinder 24.

Figure 4:
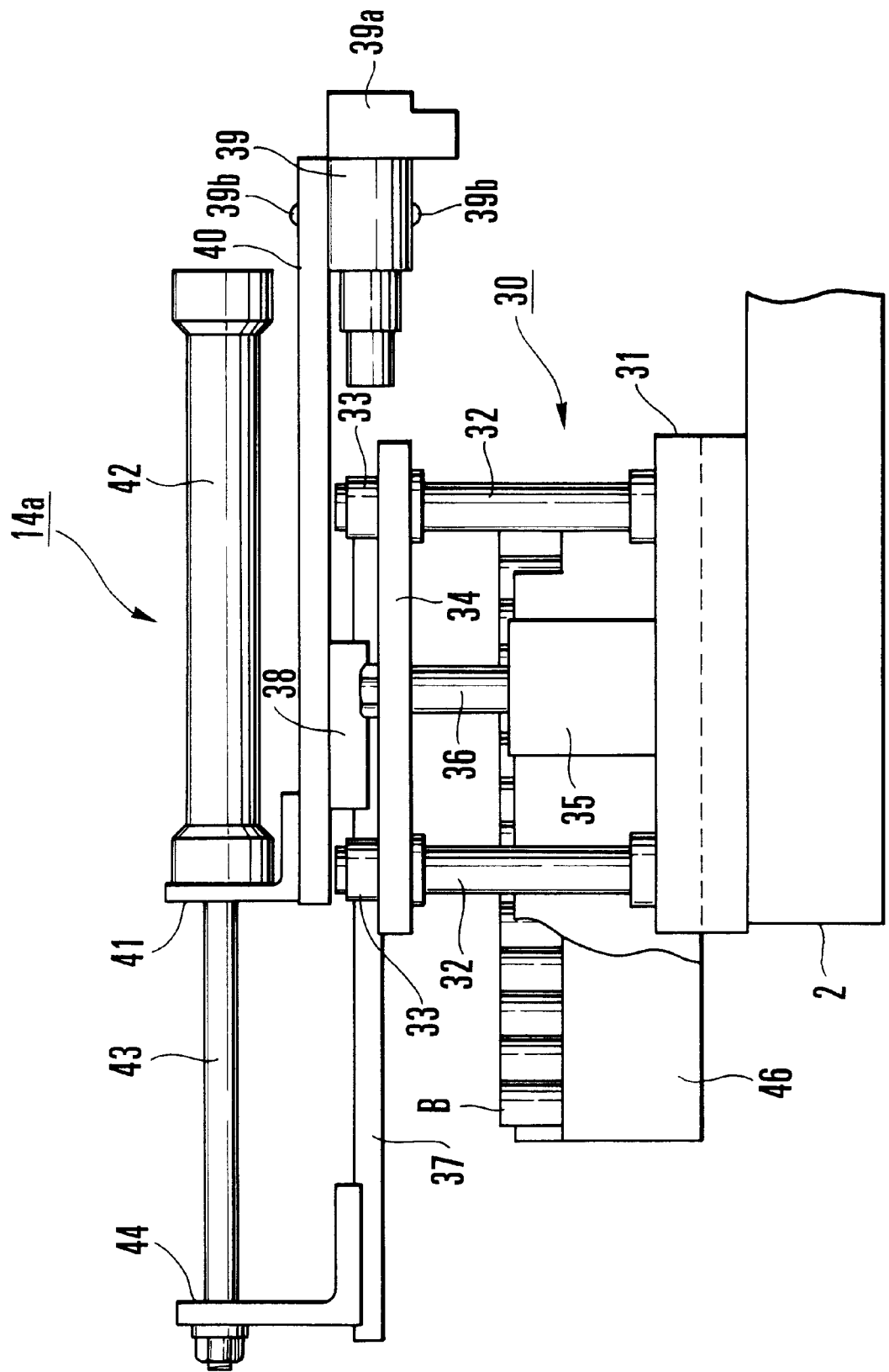
FIG. 4 is a side view showing a part pick-and-place device.

As shown in FIG. 3, three part pick-and-place devices 14a, 14b, and 14c are radially provided. Each device has the same construction as the other devices. Therefore, respective parts of devices are identified by the same reference numerals. FIGS. 4 shows the part pick-and-place device 14a. The device has an elevating device 30. The device 30 has a pair of guide posts 32 secured on a base plate 31 which is securely mounted on the base plate 2. A movable plate 34 is vertically slidably mounted on the guide posts 32, interposing guide bushes 33 respectively. The movable plate 34 is connected to a piston rod 36 of a pneumatic cylinder 35 which is secured to the base plate 31. A slide guide rail 37 is secured to the movable plate 34. A slide block 38 is slidably mounted on the slide guide rail 37. A supporting plate 40 is secured to the slide block 38. A horizontal pneumatic cylinder 42 is secured to the supporting plate 40 through a connecting plate 41, and a piston rod 43 of the cylinder 42 is connected to the slide guide rail 37 through a connecting plate 44. On the underside of the supporting plate 40, a horizontal pneumatic cylinder 39 having a chuck 39a is secured by screws 39b.

The chuck 39a is opened in a normal state. The chuck is closed for gripping a part B and opened again for releasing the work in accordance with the operation of the cylinder 39. The chuck device is well known.

As shown in FIG. 3, a guide rail 46 is connected to a well known parts feeder 45 and communicated with a groove 47 provided on the base plate 31.

The part pick-and-place device 14b is provided for feeding a part C, and the device 14c is provided for feeding a part D.

Referring to FIGS. 2 and 3, on a progressive feed line, a guide rail 49 is securely mounted. Slidably mounted on the guide rail 49 is a slide block 50 on which a part holder 48 is mounted. The slide block 50 is connected to a piston rod 52 of a pneumatic cylinder 51 mounted on the guide rail 49.

The illustrated embodiment of the present invention is provided for assembling parts into a thermo-actuator provided in a wax-pellet thermostat for a cooling system of an automotive engine.

FIG. 5a shows the thermo-actuator, and FIGS. 5b to 5f shows respective parts for the thermo-actuator.

In operation, a part A for a first step which has been worked and assembled at a previous stage is introduced in the part holder 48 through a chute (not shown) as shown in FIGS. 2 and 3. The part A is transferred to the position P1 together with the part holder 48 by the piston 52 of the pneumatic cylinder 51.

On the other hand, in the part pick-and-place device 14a (FIG. 4), the chuck 39a which has been opened is lowered, holds a part B for the first step, and raised by the piston 36 of the pneumatic cylinder 35. The piston 43 of the pneumatic cylinder 42 causes the supporting plate 40 and chuck 39a to move forwardly to the position P1. Then, chuck 39a is lowered by the piston 36 so that the part B is inserted into the part A. The chuck 39a is opened and raised and returned to the original position, keeping the chuck opened. Thereafter, the upper movable plate 8 is lowered by the operation of the cylinder 6, so that the punch 53 is inserted in the part B to form it into a proper shape to fit in the part A, thereby forming a fist step work assembly A1. Then, the movable plate 8 is raised.

Next, the piston rods 26 (FIG. 1b) of the cylinders 18 and 19 are forwardly moved, so that the fingers 28 and 29 at the position P1 grasp the work assembly A1. Then, the base plate 10 of the work pick-and-place device 13 is raised by the operation of the pneumatic cylinder 11, and moved to the position P2 in FIGS. 2 and 3, and lowered, so that the work assembly A1 is inserted in the die 54. Then, the fingers 28 and 29 are opened, raised, returned to the position P1, and lowered.

In the next step, next parts A and B for a second step are engaged with each other in the above described operation to form a second step work assembly A1. On the other hand, a part C for the first step which has been assembled by another device (not shown) is inserted in the first step work assembly A1 by the part pick-and-place device 14b. And then, the upper movable plate 8 is lowered and raised, so that the part B is fixed in the part A for the second step. At the same time, the part C is engaged in the part B of the first step at the position P2 by the dies 54 and 55, thereby forming a first step work assembly A2.

Here, although the work assembly A1 has a space a (FIG. 2) sufficient for receiving the fingers 28 and 29, the work assembly A2 engaged in the die 54 has not such a sufficient space. Hence, the work assembly A2 is raised by a collar 60 secured to a piston rod 59 of a pneumatic cylinder 58 so as to form a space a.

Thus, fingers 28, 29 at the positions P1 and P2 carry the second step work assembly A1 and the first step work assembly A2 to the positions P2 and P3. At the position P3, the first step work assembly A2 is inserted in a die 56.

In the next step, a third step work assembly A1 and a second step work assembly A2 are assembled in the same operation as the above described operation. On the first step work assembly A2 at the position P3, the part D is engaged by a die 57, so that a first step assembly A3 which is a finished work is assembled.

Next, fingers 28, 29 at the positions P1, P2 and P3 carry the assemblies A1, A2 and A3 to the position P2, P3 and P4. At the position P4, the finished work assembly A3 (FIG. 5a) is discharged by a chute (not shown).

Thereafter, three assemblies A1, A2 and A3 are assembled at the same time at every cycle of the operation.

In the robot, automatic centering means is provided as described below.

The inner diameter of each of the cylinders 18 is set to a larger value than that of the cylinder 19 at the other side, so that each cylinder 18 has a larger air pressure than that of the cylinder 19. Therefore, the part engaged with the finger 28 of the cylinder 18 is not moved if the work is pushed by the finger 29 of the cylinder 19. Namely, the position of the work is determined only by the finger 28 of the cylinder 18. Thus, centering of the work is accurately determined with respect to the center of each die. Consequently, break of the die due to eccentric positioning of the work is prevented.

In accordance with the present invention, a single robot can assemble four parts into a finished product. Thus, the robot can be manufactured in small size and at a low cost.

While the invention has been described in conjunction with preferred specific embodiment thereof, it will be understood that this description is intended to illustrate and not limit the scope of the invention, which is defined by the following claims.

What is claimed is:

1. A multi-stage assembling robot comprising:
a die set having a base plate, vertical guide posts having a top portion and a bottom portion, securely mounted on said base plate, a horizontal cylinder plate securely mounted on top portions of said guide posts, an upper movable plate and a lower movable plate which are slidably mounted on said guide posts between said base plate and said horizontal cylinder plate;
at least three sets of upper and lower dies mounted on said upper movable plate and said base plate respectively;
the lower dies being provided for vertically slidably holding works;
a first cylinder mounted on said cylinder plate, said cylinder having a piston rod which is connected to the upper movable plate so as to lower and raise the upper movable plate and move the upper dies toward the lower dies;
a second cylinder mounted on an underside of said base plate, said second cylinder having a piston rod which is connected to the lower movable plate so as to raise and lower the lower movable plate and move the lower dies toward the upper dies;
a work pick-and-place device horizontally movably mounted on said lower movable plate so as to be reciprocated in the horizontal direction and reciprocated in the vertical direction by said second cylinder;
a third cylinder mounted on said lower movable plate for progressively transferring works on said lower dies by combining operation of said second cylinder;
at least three part pick-and-place devices radially mounted on said base plate, each of the part pick-and-place devices being provided to be reciprocated in the horizontal direction and reciprocated in the vertical direction so as to feed parts one by one to a corresponding lower die;

three sets of opposite grasping fingers mounted on the work pick-and-place device, each provided for grasping a vertical periphery of a work inserted in the lower die;

three sets of opposite cylinders mounted on the work pick-and-place device and connected to the grasping fingers so that each set of the grasping fingers grasps the work;

one of said lower dies having a vertically perforated hole;

a fourth cylinder provided on the base plate, and having a piston inserted in the perforated hole for upwardly projecting a work held in the perforated hole of the lower die so as to be grasped by a corresponding set of grasping fingers.

2. The robot according to claim 1 wherein each of the part pick-and-place device includes has a chuck for grasping a part.

3. A multi-stage assembling robot for performing a plurality of operations on a plurality of workpieces comprising:

a die set having a base plate, vertical guide posts having a top portion and a bottom portion, securely mounted on said base plate, a horizontal cylinder plate securely mounted on top portions of said guide posts, an upper movable plate and a lower movable plate which are slidably mounted on said guide posts between said base plate and said horizontal cylinder plate;

at least three sets of upper and lower dies mounted on said upper movable plate and said base plate respectively;

a first cylinder mounted on said cylinder plate, said cylinder having a piston rod which is connected to the upper movable plate so as to lower and raise the upper movable plate and move the upper dies toward the lower dies;

a second cylinder mounted on an underside of said base plate, said second cylinder having a piston rod which is connected to the lower movable plate so as to raise and lower the lower movable plate and move the lower dies toward the upper dies;

a work pick-and-place device mounted on said lower movable plate provided to be reciprocated in the horizontal direction and reciprocated in the vertical direction by said second cylinder so as to progressively transfer works on said lower dies;

at least three part pick-and-place devices radially mounted on said base plate, each of the part pick-and-place devices being provided to be reciprocated in the horizontal direction and reciprocated in the vertical direction so as to feed parts one by one to a corresponding lower die.

4. A multi-stage assembling robot for performing a plurality of operations on a plurality of workpieces comprising:

a die set having a base plate, vertical guide posts having a top portion and a bottom portion, securely mounted on said base plate, a horizontal cylinder plate securely mounted on top portions of said guide posts, an upper movable plate and a lower movable plate which are slidably mounted on said guide posts between said base plate and said horizontal cylinder plate;

at least three sets of upper and lower dies mounted on said upper movable plate and said base plate respectively;

one of the lower dies being provided for vertically slidably holding a work;

a first cylinder mounted on said cylinder plate, said cylinder having a piston rod which is connected to the upper movable plate so as to lower and raise the upper movable plate and move the upper dies toward the lower dies;

a second cylinder mounted on an underside of said base plate, said second cylinder having a piston rod which is connected to the lower movable plate so as to raise and lower the lower movable plate and move the lower dies toward the upper dies;

a work pick-and-place device mounted on said lower movable plate provided to be reciprocated in the horizontal direction and reciprocated in the vertical direction by said second cylinder so as to progressively transfer works on said lower dies;

at least three part pick-and-place devices radially mounted on said base plate, each of the part pick-and-place devices being provided to be reciprocated in the horizontal direction and reciprocated in the vertical direction so as to feed parts one by one to a corresponding lower die;

three sets of opposite grasping fingers mounted on the work pick-and-place device;

three sets of opposite cylinders mounted on the work pick-and-place device and connected to the grasping fingers so that each set of the grasping fingers grasps the work; and, a third cylinder device provided on the base plate for upwardly moving the work slidably held in the lower die so as to be grasped by said set of grasping fingers.

* * * * *